United States Patent [19]
Marzocco

[11] 3,982,501
[45] Sept. 28, 1976

[54] AUTOMATIC DOG AND CAT FEEDER

[76] Inventor: Angelo T. Marzocco, 4600 Nelson St., Fremont, Calif. 94538

[22] Filed: Dec. 4, 1974

[21] Appl. No.: 529,572

[52] U.S. Cl. ............................................. 119/51.14
[51] Int. Cl.² ............................................. A01K 5/02
[58] Field of Search .......... 119/51.14, 51.12, 51.13, 119/51.11, 51.5, 56

[56] References Cited
UNITED STATES PATENTS

| 779,434 | 1/1905 | Lyon | 119/51.14 |
| 3,196,835 | 7/1965 | Bergevin | 119/51.5 X |

*Primary Examiner*—Hugh R. Chamblee

[57] ABSTRACT

An animal feeder including a feed hopper and a timer actuated discharge means.

The discharge means including a panel for closing the hopper held in place by a magnetic catch and released by a push type solenoid means.

2 Claims, 6 Drawing Figures

AUTOMATIC DOG AND CAT FEEDER

My invention relates to a novel device for feeding a dog or cat. More specifically, my invention relates to a novel device whereby a person using it may select a specific time of day to feed his dog or cat and feeding will be accomplished automatically.

My device as opposed to the conventional method of feeding a dog or cat will be of great convenience, advantage and savings to the person using it. When a person is away for many hours during the day and especially when he is away for the weekend, my device will feed his animals automatically, therefore, eliminating costly Kennel fees, or the employment of a person to care for the animal. My device will also enable the user to leave his dog or dogs home for protection while he is away.

It is an object of my invention to provide a device which will eliminate the process of feeding a dog or cat manually.

It is another object of my invention to provide a feeder which will be low cost, portable and sanitary, and also to provide a feeder which can be used for many other types of animals.

It is the final object of my invention to provide an automatic feeder so constructed in a way that enables the timer incorporated to be used for timing other appliances, if desired, while the feeder is not in use.

OPERATION

My automatic dog and cat feeder operates as follows:

1. place feeder in selected location indoors or outdoors.
2. close trap door of upper food compartment. Trap door is held closed by a magnetic catch.
3. place a tray in lower compartment, directly under trap door of upper food compartment.
4. place selected food in upper food compartment and place lid over food compartment.
5. set timer to selected time and plug electrical cord into available currant. Feeder is now in operation.

When selected time is reached, external currant will be transmitted from timer to a continuous duty push type solenoid mounted internally in a vertical position over trap door of food compartment. Solenoid Rod resting on a striker plate attached to trap door, will then be activated by solenoid, thus driving rod down vertically releasing the magnetic catch holding the trap door. Food will then drop down by gravity to food tray below. Dog or cat may now eat. When the timer reaches the off position, the solenoid will be deactivated. The timer may be used independentally, if desired by unplugging it from upper compartment.

The objectives and operation of my invention will be evident to those skilled in the art from the study of the following description and accompanying drawings which form a part of this specification in which.

The structure of my feeder is made from wood and fastened together with wood screws, but I do not limit the use of other low cost suitable rigid material and assembly thereof by a method best suited for the material used.

Figure 1:
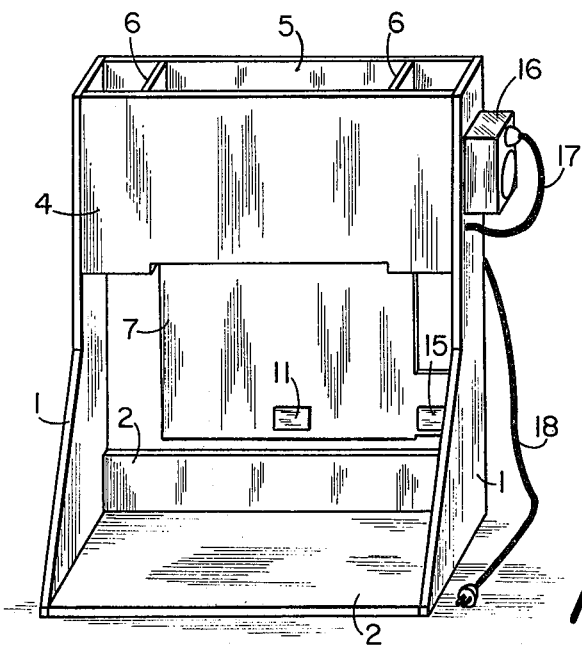
FIG. 1 represents a front view of feeder. The lid removed and the trap door of the food compartment in an open or vertical position.
Figure 2:
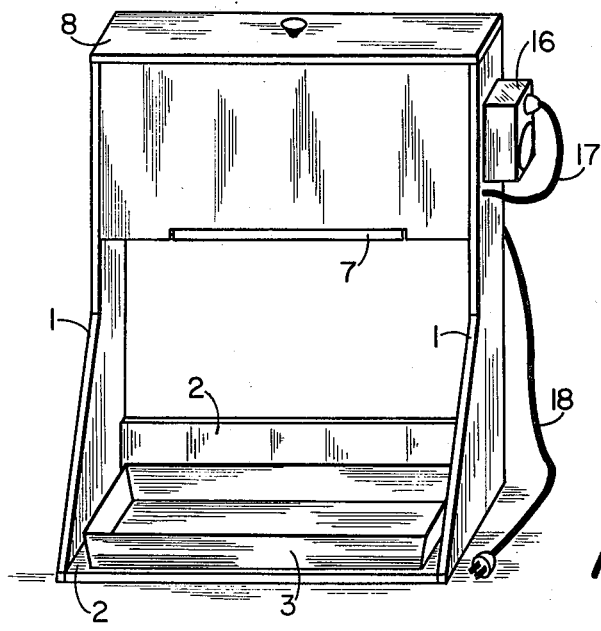
FIG. 2 represents a front view of feeder with lid on and trap door of food compartment in a closed or horizontal position. A food tray is shown in lower compartment.
Figure 3:
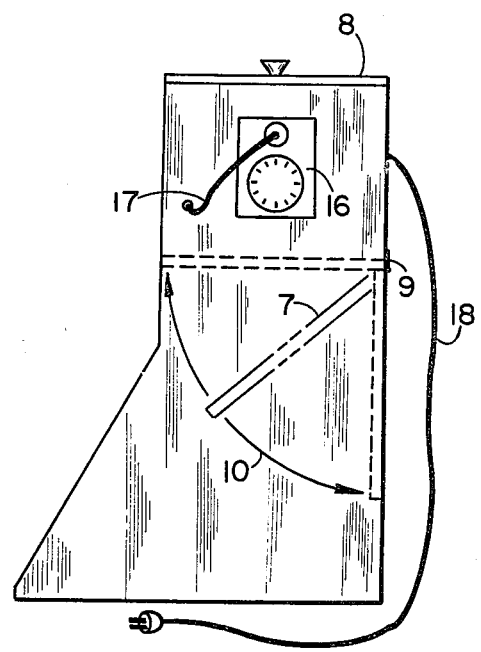
FIG. 3 represents a right side view of feeder, including timer and a view representing swinging motion of trap door from vertical to horizontal position or horizontal to vertical position.
Figure 4:
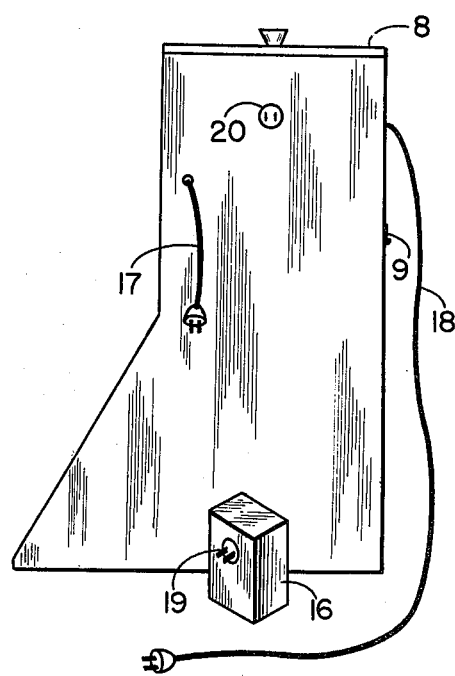
FIG. 4 represents a right side view of feeder with timer unplugged from upper compartment.
Figure 5:
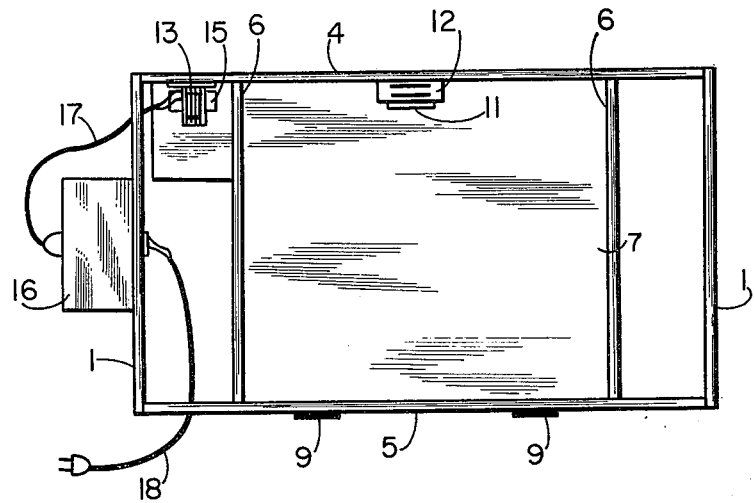
FIG. 5 represents an enlarged top view of upper compartment only. The lid removed, trap door in closed or horizontal position, magnetic catch, solenoid, timer, and wiring.
Figure 6:
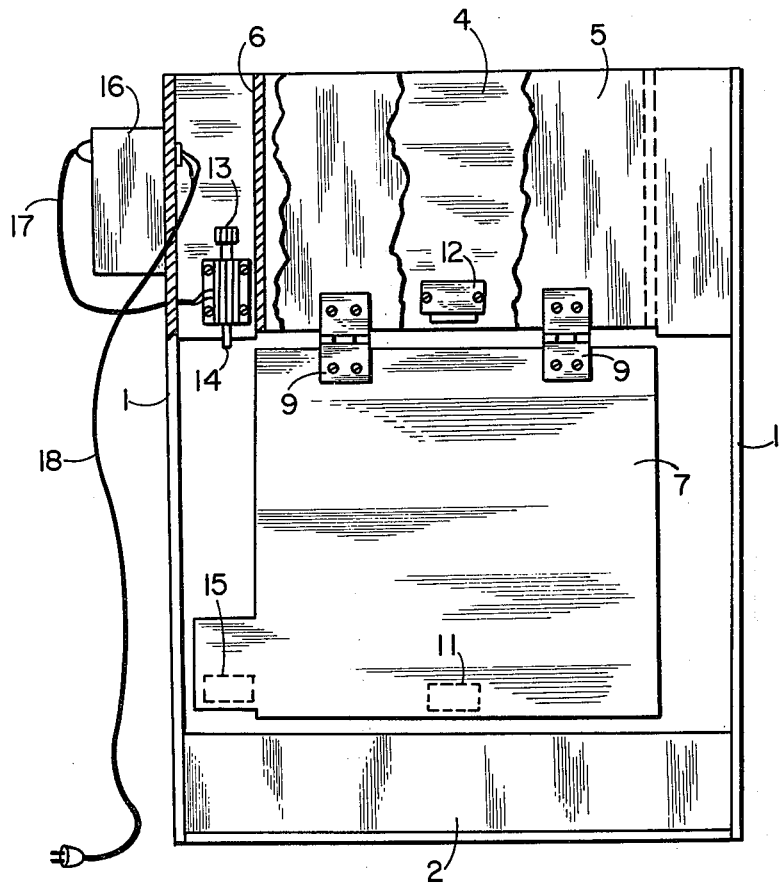
FIG. 6 represents an enlarged view of back side showing trap door in an open or vertical position, a cut away view of back panel showing magnetic catch mounted to front panel, solenoid mounted to front panel, timer and wiring.

The construction of my feeder is as follows: FIG. 1 Two main outer supports 1, a lower base 2 fastened between outer supports 1. FIG. 2 Lower base compartment 2 to hold tray 3. FIG. 1 an upper compartment fastened between outer supports 1, comprising of using a front panel 4, FIG. 6 a back panel 5, FIG. 5 two cross panels 6 and a trap door 7. FIG. 2 a lid 8 is used to close top of upper compartment. FIG. 5 food compartment section of upper compartment is formed between front panel 4, back panel 5, cross panels 6 and trap door 7. This construction of outer supports, upper compartment and lower base compartment would form a single portable structure. FIG. 6 trap door 7 is attached to back panel 5 by hinges 9. The hinges enabling the trap door to swing in a motion to vertical position open or horizontal position to close the food compartment. FIG. 3 shows swinging motion 10. Although hinges are preferred, I do not limit the use of other suitable means. FIG. 1 attached to trap door 7 is a steel plate 11 of which is part of FIG. 5 a magnetic catch assembly 12 used to keep trap door in a closed or horizontal position, FIG. 5. When the trap door 7 is moved to a closed or horizontal position, the steel plate 11 is attracted to the magnetic catch 12 and held closed. FIG. 6 you will see a push type solenoid 13 in a vertical position attached to surface wall of front panel 4. Solenoid 13 is separated from food compartment by cross panel 6. FIG. 6 Solenoid rod 14 rests on a FIG. 5 striker plate 15 attached to trap door 7 when in a closed or horizontal position. FIG. 6 when solenoid 13 is activated by current from timer 16 the solenoid rod 14 will thrust down vertically against FIG. 5 striker plate 15 attached to trap door 7, thereby releasing trap door 7 from the magnetic catch 12. FIG. 5 we can see wires 17 leading from solenoid 13 through outer support 1 and plugged into externally mounted timer 16. Wires 18 of timer 16 lead internally through outer support 1 and out through back panel 5 and plug into available current. FIG. 4 we can see timer 16 unplugged from upper compartment by means of a female plug adapter 20 and male type connections 19 used on timer 16. Timer 16 may be used independentally in this position, for other purposes, while feeder is not in use.

I claim:

1. A dual purpose device primarily for feeding a dog or cat at a predetermined time automatically and for timing other devices if desired by the user comprising:

a compartment for food storage and electrical apparatus;

front and rear panels divided by cross members and supported by outer braces whereby forming said compartment;

a lid to close or open top of said compartment;
a lower panel to close or open bottom of said compartment;
means for attaching said panel to said compartment whereby enabling said lower panel to swing opening or closing said compartment;
a lower compartment for holding and positioning a separate tray or pan under said food compartment;
a base panel fastened between same said outer braces of said food compartment whereby forming the said lower compartment;
whereby all above said structures forming a single portable unit;
said device further includes a push type solenoid with selected thrust power and stroke of said solenoid rod means for attaching and positioning said solenoid to interior wall of said front panel of said food compartment whereby when said lower panel of said food compartment is in a closed position and held closed by said magnetic catch and the said solenoid is activated a thrust action of said solenoid rod will make contact with a striker plate attached to said lower panel overpowering pull of said magnetic catch thereby releasing said lower panel from said food compartment, and allowing food in said food compartment to fall downward by gravity to said tray positioned in said lower compartment.

2. A device as defined in claim 1 which further includes a timing device portable in design and having male and female electrical connections whereby said timer can be plugged into female electrical connector attached to exterior wall of said outer braces of said food compartment and whereby electrical conducting wires leading from said solenoid lead through hole in said outer braces of said food compartment and plug into said female connection of said timer and whereby electrical conducting wires leading from said female electrical connector lead through hole in said rear panel of said food compartment and plugs into external available power thereby completing an electrical circuit from said external power to said female connector to said timer to said solenoid and whereby this arrangement of said circuit will also enable said timer to be used independently if desired.

* * * * *